Aug. 26, 1958     F. D. GUGELER     2,849,145
INSULATED WATER SOFTNER TANK
Filed Jan. 3, 1955
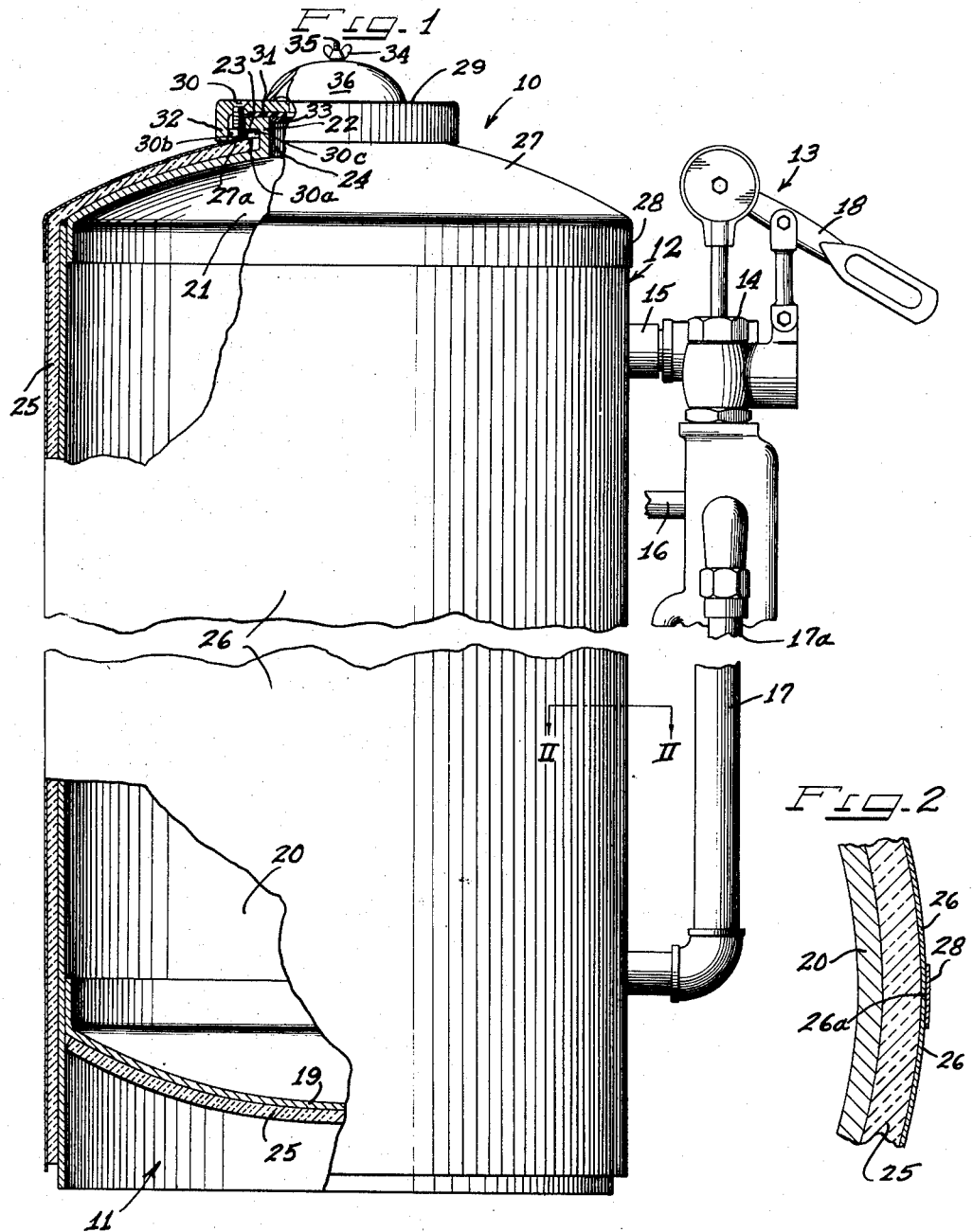
Inventor
FREDERICK D. GUGELER United States Patent Office 2,849,145
Patented Aug. 26, 1958

2,849,145

INSULATED WATER SOFTENER TANK

Frederick D. Gugeler, Lombard, Ill.

Application January 3, 1955, Serial No. 479,440

2 Claims. (Cl. 220—14)

The present invention relates to a new and improved insulated water softener or like tank construction which effectively prevents the condensation of moisture on the surface of the tank, and particularly relates to a novel cover assembly which is adapted to protectively encase a heat insulating material enveloping a cold water tank.

As is well known, water is usually softened while cold, especially for domestic purposes. Because of this water softener tanks conventionally receive only cold water and are, therefore, usually at a temperature considerably below the temperature of the ambient atmosphere. This contrast in temperatures creates a problem with regard to water softeners installed in basements, or laundry or utility rooms where the moisture content of the air may, especially during humid summer weather, be relatively high. The water vapor in the warm ambient atmosphere continually condenses on the surface of the cold water softener tank causing the tank to "sweat" and run-off. Unless provisions are made to alleviate this condition, such as by the use of a dehumidifier or the like, a pool of condensate may collect on the floor adjacent the water softener tank or a run-off stream extend across the floor. This is not only a nuisance, but may create a slippage hazard.

Although this collecting of condensate on cold water tanks can be prevented by insulating the tanks, such practice has not been found entirely satisfactory. This is due largely to the inherent physical properties of most of the acceptable insulating materials, which generally are of a porous or fibrous nature and are not durable enough to resist the mechanical abrasion to which water softeners are commonly exposed due to their normal household locations, nor are they water shedding.

A particular problem in providing water softener tanks with enclosures of unprotected insulating materials arises from the customary manner of recharging by introducing salt into the softening unit through an access opening in the top of the tank. During the recharging operation, or in subsequently flushing out the brine, water may overflow or leak from the access opening. When this occurs any unprotected insulation affixed to the surface of the tank may become saturated with water. This saturation not only minimizes the effectiveness of the insulation but also deteriorates most fibrous insulating materials. Because of this, most water softener tanks have not been provided with a covering of insulating material.

According to the general features of this invention there is provided a new and improved water softener tank construction which is effectively insulated against condensation.

One of the main objects of the present invention is the provision of a cold water tank enveloped in a thermal insulating material which is effectively protected against mechanical abrasion and moisture damage by means of a novel protective covering which overlies and encases the insulating material.

Another object is to provide an attractive, self-sustaining, two-piece protective cover assembly which is adapted efficiently to encase a heat insulating material disposed about a water softener or like tank and which not only protects the heat insulating material from mechanical abrasion and moisture damage but also materially enhances the appearance of the tank.

A further object is to provide an attractive, self-sustaining, durable cover assembly for protectively encasing a heat insulating material disposed about a water softener or like tank, which may be readily and easily applied to existing tanks or may be supplied as original equipment.

Other objects, features and advantages of the instant invention will be readily apparent from the following detailed description taken in conjunction with the accompanying sheet of drawings illustrating a preferred embodiment thereof, and in which:

Figure 1 is a side elevational view with parts broken away and parts in section of a water softener unit having the tank thereof enclosed in the novel, protected thermal insulation construction of the instant invention; and Figure 2 is a fragmentary, enlarged sectional detail view taken substantially along the line II—II of Figure 1.

By way of example the invention is shown as embodied in a water softener unit 10, comprising a tank 11 which is encased in my novel thermal insulation 12. The tank 11 carries a pipe and valve assembly 13 through which hard, cold water is supplied to the tank, softened water is delivered to service lines from the tank, and, during recharging and flushing shut-off and directional flow are effected. This valve and pipe arrangement 13 includes a control valve 14, a water inlet or supply pipe 15 which delivers hard water to the tank 11, utility duct 16, a delivery duct 17 through which softened water is drawn off from the bottom of the tank 11, and a flushing drain duct 17a. The valve 14 is manually operated by a handle 18 and functions to control flow of water to and through the tank 11 and the various pipes.

The tank 11 comprises a generally convex or rounded bottom portion 19, a generally upright cylindrical body portion 20 and a generally circular, dome-shaped top 21. The bottom 19, the body portion 20 and the top 21 are formed from suitable metal plate and are joined together to produce the tank 11 by welding or the like. Although the tank 11 is shown as having a generally upright cylindrical configuration, it will be appreciated that it may assume other shapes if desired. Interiorly, the tank 11 provides a chamber of preferred volume within which a discrete mass of softening or other treating mineral is housed and through which the water is drawn or percolated.

An upwardly extending, annular neck flange 22 having an outwardly extending, annular rim flange 23 is formed integrally with the top 21 and defines an access opening 24 into the tank 11. The access opening 24 provides means for filling the tank 11 with a suitable particulate softening agent, such as zeolite, ion exchange type synthetic mineral, or the like, and also permits the introduction of salt into the tank for periodic recharging of the softening agent.

The protective insulated covering 12 surrounding the tank 11 comprises a layer of insulating material 25 which envelops the periphery of the tank 11, and a two-piece protective covering which encases the insulating material 25.

The insulating material 25 may comprise any suitable substance which is normally employed for its thermal insulating properties. Although the exact type of thermal insulating material 25 is not important, such insulating substances as glass wool, rock wool, cellulosic fiber bat, and other types of fibrous insulations are especially useful, for they are commercially available in various widths of uniform thickness. The layer of insulating material 25 is preferably directly in contact with and completely envelops substantially the entire tank 11 including the bottom 19, the body portion 20 and the top 21.

The two-piece protective cover which encases the layer of insulating material 25 comprises a substantially cylindrical protective sheath 26 which directly overlies the insulating material 25 covering the body portion 20 of the tank 11, and a protective cover cap 27 which overlies and encases the insulating material 25 on the top 21 of the tank 11. The insulating material 25 on the bottom 19 need not be covered, for the downwardly extending bottom margin of the body portion 20 adequately protects the bottom 19 from mechanical abrasion and water overflow.

The protective sheath 26 and the cover cap 27 are produced from a durable, self-sustaining material which is water-proof and resistant to corrosion and mechanical abrasion. Among the preferred materials for producing the protective sheath 26 and the cover cap 27 are included synthetic resins and plastic materials which may be molded and formed into the desired sheath or cover cap configurations. Synthetic plastics are especially desirable in that they are light weight and are available in a variety of attractive colors. It will be apparent, of course, that other materials, such as suitable sheet metals or the like, could also be employed in producing the protective sheath 26 and the cover cap 27.

The protective sheath 26 may conveniently be formed from a rectangular sheet of a suitable material. The sheet from which the protective sheath 26 is formed preferably has a width substantially equal to the height of the body portion 20 of the tank 11 and a length equal to the outer circumference of the insulating material 25 affixed to the periphery of the body 20 of the tank. The end edges of the sheet from which the protective sheath 26 is formed are provided with suitable semicircular cutout portions adapted to coincide with the location of the pipes 15 and 17 connected to the tank.

The protective sheath 26 is disposed about the layer of insulating material 25 on the body portion 20 by flexing or bending the sheath into a substantially cylindrical configuration. The semi-circular cutout portions referred to previously are aligned to coincide with the pipes 15 and 17 to form a complete enclosed cylinder about the insulating material 25 on the body portion 20.

The vertical edges of the sheet forming the protective sheath 26, as shown in Figure 2, lie in close spaced or abutting relationship forming a seam 26a therebetween. The seam 26a is closed and the two edges of the sheath 26 united together by suitable means to form a self-sustaining cylindrical tube. This joining together of the edges of the sheath 26 may be accomplished in various ways such as by heat sealing, adhesives or the like. In the one embodiment, as shown in Figure 2, the seam 26a is sealed by means of a strip of tape or the like 28 which overlaps and is sealingly affixed to both edges of the sheath 26 by means of heat or a suitable adhesive. For the sake of appearance the tape 28 should preferably be of the same color and texture as the material from which the sheath 26 is made.

In the embodiment shown in Figure 1, the protective sheath 26 and the insulating material 25 covering the body portion 20 of the tank 11 do not extend clear to the bottom edge of the tank. A small area on the bottom margin of the body portion 20 is left uncovered to facilitate the attachment of legs or the like for supporting the water softener tank.

The protective cover cap 27, which is preferably formed of the same or similar material as employed in producing the protective sheath 26, is formed so as to have a dome-shaped configuration which will conform to the general shape of the top 21 of the tank 11. The protective cover cap 27 is provided with a centrally located aperture of suitable slightly larger inside diameter to receive the upwardly extending neck flange 22 when the cover cap 27 is mounted upon the insulating material 25 on the top 21.

The protective cover cap 27 is also provided with a downwardly extending marginal annular skirt flange 28 having an inner diameter approximately equal to and adapted for sliding fit about the outer diameter of the upper margin of the protective sheath 26. When the protective cover cap 27 is positioned upon the tank 11 to overly and encase the insulating material 25 on the top 21, the downwardly extending marginal skirt flange 28 preferably allows the cover cap 27 to be engaged snugly over the upper edge portion of the protective sheath 26. This snug fitting between the downwardly extending marginal skirt flange 28 and the upper edge portion of the sheath 26 provides a seal against the influx of water between the cover cap 27 and the sheath 26 without the necessity of employing adhesives, heat sealing or the like.

An annular cover plate 29 having a downwardly extending marginal skirt flange 32 is provided on top of the upwardly extending neck flange 22 and is removably attached thereto by means of a plurality of suitable circumferentially spaced machine screws 30 and nuts 30a. A gasket 31 is interposed between the neck flange 22 and the annular cover plate 29 to prevent leakage of water between the neck flange and cover plate. When the cover plate 29 is mounted upon the neck flange 22, the free edge of the skirt flange 32 contacts the outer surface of the protective cover cap 27 and is drawn tightly, resiliently thereagainst by the screws 30. This engagement between the flange 32 and the cover cap 27 provides a seal against the influx of water between the cover cap 27 and the upwardly extending neck flange 22.

The nut 30a is of sufficient diameter that an external wrench-engaging flat on one side thereof, as at 30b, contacts the inner periphery of the depending flange 32, while the edge of the nut obverse to the flat 30b, as at 30c, extends under the outwardly projecting annular rim flange 23 of the neck flange 22. This allows the shank of a machine screw 30 to be threadedly engaged in the nut 30a and the nut drawn up tightly against the rim flange 23 by tightening down the machine screw 30. The external flat 30b contacting the inner periphery of the depending flange 32 holds the nut 30a against revolving movement as the machine screw 30 is tightened.

As seen in Figure 1, the inner marginal extremity of the cover cap 27, as at 27a, underlies the outwardly extending annular rim flange 23 and is in close spaced relation to the outer periphery of the neck flange 22. When the cover cap 27 is in place a nut 30a may be properly circumferentially positioned about the neck flange 22 by inserting an edge of the nut such as at 30c, between the bottom surface of annular rim flange 23 and the inner marginal extremity 27a of the cover cap. The cover cap 27 overlying the resilient, fibrous insulating material 25 exerts a resilient upward pressure on the nut 30a which biases the nut against the bottom surface of the rim flange 23 and holds the nut in place. This coaction between the resilient cover cap 27 and the rim flange 23 in holding the nut 30a against lateral displacement materially expedites mounting the cover plate 29 on the neck flange 22 as follows:

Machine screws 30 are introduced into all but one or more of a series of circumferentially spaced apertures in the cover plate 29 adapted to receive such screws. If more than one aperture is not provided with a screw 30 such apertures are preferably adjacent one another. Nuts 30a are then threadedly engaged on the shank of each of the machine screws to a predetermined position such that a margin of each nut will be received in the space between the cover cap 27 and the rim flange 23 when the cover plate 29 is positioned on the neck flange 22. With the nuts thus positioned the cover cap 29 is then tilted and slipped over and onto the neck flange 22 and adjusted thereon to allow a margin of each of the nuts 30a on the screws 30 to be positioned in the space between the cover cap 27 and the rim flange 23.

One or more nuts is then slipped under the depending marginal skirt flange 32 of the cover plate 29 and an edge of each nut is introduced between the cover cap 27 and the rim flange 23 to hold each nut 30a resiliently in a position at which the internal threaded bore in the nut is substantially aligned with one of the one or more apertures in the cover plate 29 which was not initially provided with a machine screw 30. A machine screw 30 is then introduced into each such aperture and threadedly engaged with the bore of the nut aligned therewith. All screws are then tightened down to rigidly affix the cover plate 29 on top of the neck flange 22.

The access opening 24 is closed by an inner closure disk 33 which tightly seals the tank 11 by internal pressure of the water while the water softener 10 is in operation. In addition, the closure disk 33 is held in sealing relation against the gasket 31 interposed between the neck flange 22 and the cover plate 29 by means of a wing nut 34 which is threadedly engaged on a stem 35 attached to the closure disk 33. The wing nut 34 thrusts against a bridge member 36. The operation of the closure disk 33, in sealing the tank 11 is more fully disclosed in my co-pending patent application Serial No. 255,202 filed November 7, 1951, now Patent No. 2,729,359, issued January 3, 1956.

The protective sheath 26 and the cover cap 27 provided a self-sustaining durable shell which effectively encases the insulating material 25 against any mechanical abrasion and moisture damage to which the water insulation might be exposed in normal use. By having the cover cap 27 overlap the upper edge of the sheath 26, and by having the skirt flange 32 of the cover plate 29 in tight sealing engagement with the outer surface of the cover cap 27, any water which might over-flow or leak from the access opening 24 during recharging of the tank 11 is successfully drained off without wetting the insulating material 25. The downwardly sloping relationship of the cover plate 29 to the cover cap 27 and the cover cap 27 to the sheath 26 requires that any water entering at these points must necessarily run uphill which, of course, is highly improbable.

It will be apparent to those skilled in the art that the instant invention provides a new and improved cold water or like tank construction which is effectively insulated against condensation and in which the insulating material employed is protectively encased in a durable, self-sustaining water proof shell which saves the insulating material against all mechanical abrasions and moisture damage.

It will be understood that modifications and variations may be effected without departing from the scope of the novel concepts of the present invention.

I claim as my invention:

1. In a tank construction of the character described including a tank body having a top with an opening defined by a neck provided with an annular lateral flange overlying the top in spaced relation, insulation for encasing the tank body and top, a protective sheath structure for protectively encasing the insulation, said sheath structure including a cap having an aperture therethrough for receiving said neck to overlie the insulation on the top of said tank, said aperture being defined by an inner resilient margin to underlie said annular lateral flange in spaced relation thereto, a cover plate for disposition on said neck, and having a depending peripheral flange to overlie said cap margin in encompassing relation about said lateral neck flange and with said inner margin of the cap projecting substantially radially inwardly beyond said depending cover plate flange, a plurality of circumferentially spaced nuts located inside of said depending cover plate flange under said annular lateral neck flange and each having a margin thereof resiliently urged by said cap margin toward underside of the opposing margin of said annular lateral flange, and screws engaging said plate and drawing up said nuts against said lateral neck flange for sealingly securing said plate to said neck and with said depending peripheral flange in assembled relation to said cap margin.

2. A tank construction as defined in claim 1 wherein said nuts have edges thereof contacting the inner side of the depending peripheral flange of the cover plate for retaining the nuts against turning.

References Cited in the file of this patent

UNITED STATES PATENTS

| 611,003 | Roth | Sept. 20, 1898 |
| 1,235,128 | Frank | July 31, 1917 |
| 1,706,064 | Hummer | Mar. 19, 1929 |
| 2,214,294 | Day | Sept. 10, 1940 |
| 2,365,086 | Kamowski | Dec. 12, 1944 |
| 2,376,064 | Knapp | May 15, 1945 |

FOREIGN PATENTS

| 615,701 | France | Oct. 16, 1926 |
| 419,394 | Great Britain | Nov. 12, 1934 |
| 545,680 | Great Britain | June 8, 1942 |